United States Patent [19]
Vinegar et al.

[11] Patent Number: 5,497,087
[45] Date of Patent: Mar. 5, 1996

[54] NMR LOGGING OF NATURAL GAS RESERVOIRS

[75] Inventors: Harold J. Vinegar, Houston, Tex.; Ridvan Akkurt, Mandeville, La.; Pierre Tutunjian, Houston, Tex.

[73] Assignee: Shell Oil Company, Houston, Tex.

[21] Appl. No.: 326,560

[22] Filed: Oct. 20, 1994

[51] Int. Cl.$^6$ ............................ G01V 3/08; G01V 3/14
[52] U.S. Cl. ........................................ 324/303; 324/300
[58] Field of Search .................................. 324/300, 301, 324/303, 306, 307, 309, 318

[56] References Cited

U.S. PATENT DOCUMENTS

| | | | |
|---|---|---|---|
| 4,710,713 | 12/1987 | Strikman | 324/303 |
| 4,717,876 | 1/1988 | Masi et al. | 324/303 |
| 4,717,877 | 1/1988 | Taicher et al. | 324/303 |
| 4,717,878 | 1/1988 | Taicher et al. | 324/303 |
| 4,719,423 | 1/1988 | Vinegar et al. | 324/303 |
| 5,023,551 | 6/1991 | Kleinberg | 324/303 |
| 5,212,447 | 5/1993 | Paltiel | 324/300 |
| 5,280,243 | 1/1994 | Miller | 324/303 |
| 5,285,158 | 2/1994 | Mistretta | 324/309 |
| 5,289,127 | 2/1994 | Doddrell et al. | 324/314 |
| 5,291,137 | 3/1994 | Freedman | 324/303 |
| 5,309,098 | 5/1994 | Coates et al. | 324/303 |

OTHER PUBLICATIONS

SPE Paper 28365, "Improved Log Quality with a Dual–Frequency Pulsed NMR Tool".
Dawson et al., AICHE Journal, V. 16, No. 5, p. 726 (1970).
SPE Paper 22723, "The Magnetic Resonance Imaging Log Characterized by Comparison With Petrophysical Properties and Laboratory Core Data," Oct. 8, 1991.

*Primary Examiner*—Sandra L. O'Shea
*Assistant Examiner*—Maele Haynes
*Attorney, Agent, or Firm*—Del S. Christensen

[57] ABSTRACT

A lithology-independent method of well logging to estimate the pore size within a formation containing natural gas. The method makes use of a pulsed NMR logging tool utilizing a recovery time that is greater than the relaxation time of hydrocarbon gas within the formation. In a preferred embodiment, two different NMR logs are obtained: one with a recovery time significantly shorter than the longitudinal relaxation time, T1, of the gas and one with a recovery time equal to or longer than T1. The amplitudes of the two logs are subtracted to determine a restricted diffusion coefficient of the gas. The restricted diffusion coefficient can then be used to estimate pore size and permeability of the formation by means of a relationship between measured restricted diffusion coefficient, surface to volume ratio, and estimated bulk diffusion ratio of the gas.

10 Claims, 3 Drawing Sheets

NMR LOGGING OF NATURAL GAS RESERVOIRS

FIELD OF THE INVENTION

The invention relates to nuclear magnetic resonance logging of wellbores to estimate pore size within the formation.

BACKGROUND OF THE INVENTION

In the exploitation of hydrocarbon reservoirs, use is made of well logging to determine the amount of recoverable hydrocarbons. Logging tools such as density, neutron, and resistivity logs, have been developed for measurement of reservoir properties such as porosity and water and hydrocarbon saturation of pore space. These tools are widely utilized in the oil industry. However, in order to accurately determine porosity using these tools, the lithology of the rock must be known. Many other rock and fluid properties, such as salinity, cementation factor, saturation exponent, and shaliness, must be known from sources such as resistivity logs to determine hydrocarbon saturation. In addition, methods are not known for estimating pore size or permeability in a continuous log, i.e. without taking fluid samples.

Nuclear Magnetic Resonance ("NMR") well logging tools capable of determining the liquid contents of pore volume within a reservoir, and a method to use these tools are described in, for example, U.S. Pat. Nos. 5,309,098, 5,291,137, 5,280,243, 5,212,447, 4,717,878, 4,717,877, 4,717,876, and 4,710,713. In particular, U.S. Pat. No. 5,291,137 discloses a Carr-Purcell-Meiboom-Gill ("CPMG") pulse sequence and echo response and a method to obtain free fluid porosity, total NMR porosity, bound fluid porosity, spin—spin relaxation time (which is related to pore size distribution in sandstone), and continuous permeability logs. Recovery times between CPMG pulse trains is typically between 0.5 and 1.5 seconds. Because the relaxation time of methane in typical reservoir conditions is greater than about three seconds, the total NMR porosity measured in this method could not include the volume occupied by hydrocarbon gas.

Recently, a new logging tool, the MRIL (TM NUMAR Corp. of Malvern, Pa.) has been introduced for determining the liquid-filled porosity in a lithology independent manner i.e. the tool response does not require a lithology correction to determine porosity. The MRIL uses pulsed nuclear magnetic resonance of the mobile protons in the pore space. However, according to the tool's manufacturer, this tool is not capable of measuring the hydrocarbon gas content of the pore space, For example, Chandler et al. of NUMAR in SPE 28635 "Improved Log Quality with a Dual-Frequency Pulsed NMR Tool" state that "Gas causes an uncorrectable reduction of MRIL porosities. This "gas effect" is a characteristic of all NMR logging tools."

This "gas effect" is a major disadvantage because the main or only hydrocarbon in many reservoirs is natural gas, The pore fluids in these reservoirs consist of only brine and natural gas. The inability to measure gas means that the NMR logging tool will not measure gas-filled porosity and must rely on comparison with other logging tools, such as density and neutron logs, to measure porosity.

It is therefore an object of the present invention to provide a method to determine the pore size within the formation using a nuclear magnetic resonance log wherein formation properties, other than pore pressure and temperature, do not have to be known. It is another object of the present invention to provide a method to determine the formation pore size that is not affected by the formation's clay content.

SUMMARY OF THE INVENTION

These and other objects are accomplished by a method to estimate the pore size within a formation that contains hydrocarbon gas, the hydrocarbon gas having a longitudinal relaxation time, by:

obtaining a pulsed NMR log using a recovery time that is equal to or greater than the longitudinal relaxation time of the hydrocarbon gas;

determining, from the NMR log using a recovery time that is equal to or greater than the longitudinal relaxation time of the hydrocarbon gas, a distribution of transverse relaxation times;

determining from the distribution of transverse relaxation times a restricted diffusion coefficient of hydrocarbon gas within the formation; and determining from the restricted diffusion coefficient of hydrocarbon gas within the formation the pore size within the formation.

Pore size within the formation is estimated in a preferred embodiment by: further obtaining a second NMR log using a recovery time that is significantly shorter than the estimate of the longitudinal relaxation time of the hydrocarbon gas; and wherein the distribution of relaxation times attributable to hydrocarbon gas is determined from the NMR log, using a recovery time that is significantly shorter than the estimate of the longitudinal relaxation time of the hydrocarbon gas and the NMR log using a recovery time that is equal to or longer than the estimate of the longitudinal relaxation time of the hydrocarbon gas, by subtracting distributions of transverse relaxation times from the two NMR logs.

Using either constant or pulsed magnetic field gradients, the diffusion coefficient of the gas can be measured and the amount of its restriction from the bulk diffusion by the confining pores can be used to estimate pore size and permeability.

A significant aspect of the present invention is that gas within a formation is always non-wetting. Thus, the longitudinal relaxation time, T1, of the gas will always be that of the bulk gas, not shortened by surface relaxation as are wetting liquids such as brine. T1 of bulk hydrocarbon gas depends only on its temperature and pressure, which are known accurately for most reservoirs. Moreover, the T1 of hydrocarbon gas is generally longer than the T1 of other reservoir fluids, i.e. brine and crude oil.

The NMR signal from the hydrocarbon gas can be measured even in very shaly, tight formations for which the water signal relaxes too quickly to be measured. The high diffusivity of natural gas results in the measured diffusion coefficient being restricted in pores of most rocks for short values of interecho time. In shaly rocks where the water phase has short T1 and short transverse relaxation time, T2, diffusion measurements for the water phase are not possible because the interecho time would have to be too long compared to T1 and T2. However, if one uses natural gas as a diffusional tracer, the restricted diffusion coefficient even in very shaly rocks can be measured.

The restricted diffusion coefficient is an indication of pore size. For the MRIL version C logging tool (field gradient of 17 gauss/cm and an interecho time of 1.2 ms), in rocks having a porosity of about 30 PU and greater than 1000 micron pore diameters, there will be no restriction of methane diffusion. At pore diameters of 20 microns a substantial restriction will be observed, and at 0.1 micron or less pore size, the diffusivity will be fully restricted to ($D_o$/tortuosity), where $D_o$ is the bulk diffusion coefficient.

DETAILED DESCRIPTION OF THE INVENTION

Nuclear magnetic resonance logs can measure four properties: Mo, T1, T2, and D, where Mo is the equilibrium nuclear magnetization, T1 is the longitudinal relaxation time, T2 is the transverse relaxation time, and D is the diffusion coefficient. The first three properties do not require a magnetic field gradient, while the measurement of D requires a magnetic field gradient. The gradient may be either a constant or pulsed gradient. NMR logging is normally restricted to measuring hydrogen ($^1$H) because of its strong signal and large gyromagnetic ratio.

The NMR log of the present invention is altered from that typically used in the oil industry by extension of the recovery time between pulse sequences to or beyond the longitudinal relaxation time of hydrocarbon gas within the formation being logged. A CPMG echo sequence with phase alteration of the 90° RF pulses, such as is disclosed in U.S. Pat. No. 5,291,137 can be utilized, along with a NMR logging tool such as the MRIL C available from NUMAR Corp. of Malvern, Pa. The MRIL tool is capable of sensing properties of a portion of a formation that is as much as four or five inches from the wellbore wall. This is preferred because rocks within less than two or three inches from the wellbore wall may be contaminated with drilling fluids and not at all representative of the formation in general.

Natural gas is composed predominantly of methane and light alkanes. Typically, over 75% by volume of dry gas is methane. Properties of the hydrocarbon gas within a formation can therefore be estimated with sufficient accuracy for the practice of the present invention by assuming a hypothetical hydrocarbon such as a $C_{1.1}H_{4.2}$ hydrocarbon composition.

Longitudinal relaxation times, T1, of gases such as methane are solely a function of temperature and pressure, and not of other properties of the formation. T1 for methane is discussed in, for example, C. J. Gerritsma, et al., "Proton Spin Lattice Relaxation and Self Diffusion in Methanes-Paper 2", *Physica*, v. 5, 392 (1971). T1 is considered to be proportional to the density and to vary with absolute temperature according to:

$$ln(T1) = a - b(1/T) \qquad (1)$$

where: A and B are constants and T is the absolute temperature.

Figure 1:
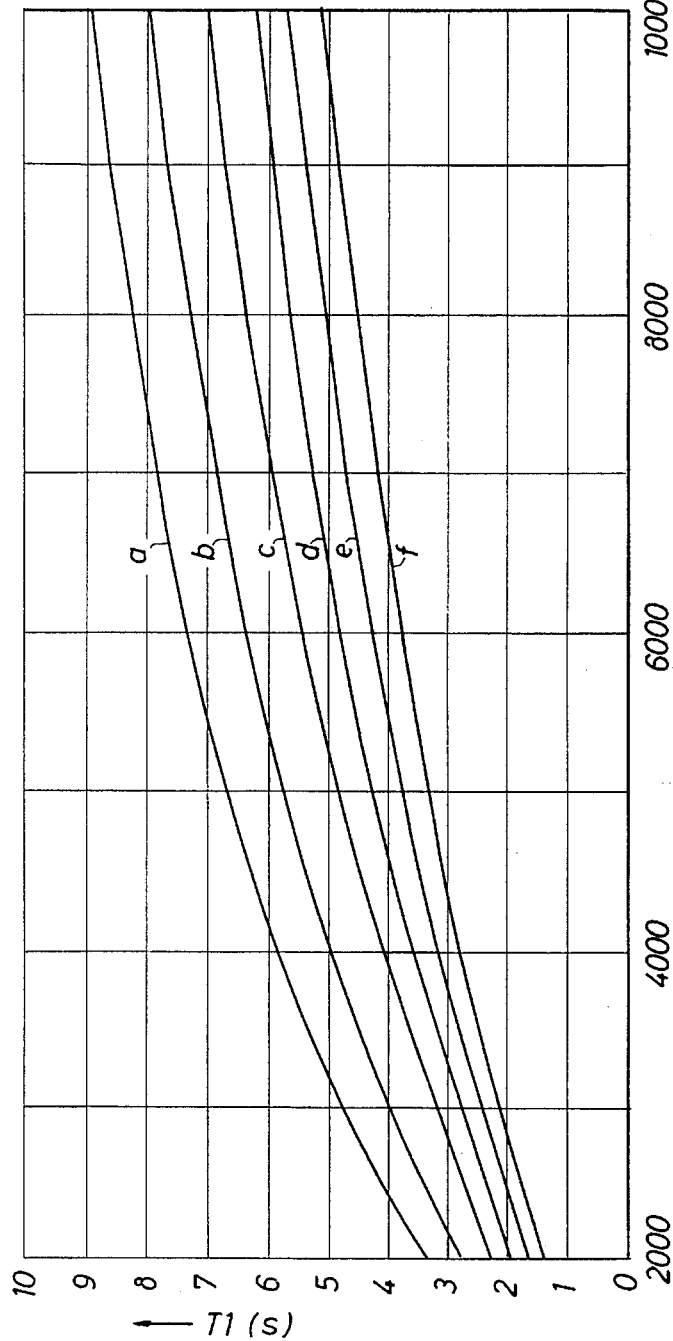
FIG. 1 is a plot of T1 of methane as a function of pressure for different temperatures.

Referring now to FIG. 1, a plot of T1 for a natural gas having a composition of $C_{1.1}H_{4.2}$ is shown as a function of pressure for different temperatures. Equation 1 can be used to extrapolate to other temperatures. Lines a through f represent T1, in seconds, for temperatures of 100° F. through 350° F. in fifty degree increments, respectively.

As an example of typical reservoir conditions, methane may have a density of about 0.2 g/cc and a temperature of about 200° F., resulting in a T1 of about four seconds. A recovery time of six seconds will generally exceed T1, and result in a NMR log that is useful in the practice of the present invention. Thus in order not to completely saturate the signal from methane the recovery time ($T_R$) in the CPMG sequence should be greater than four seconds, and preferably between about six and twelve seconds which is two to three times the T1 of gas. T1 of natural gas is between about 3 and 6 seconds for typical reservoir conditions.

Figure 2:
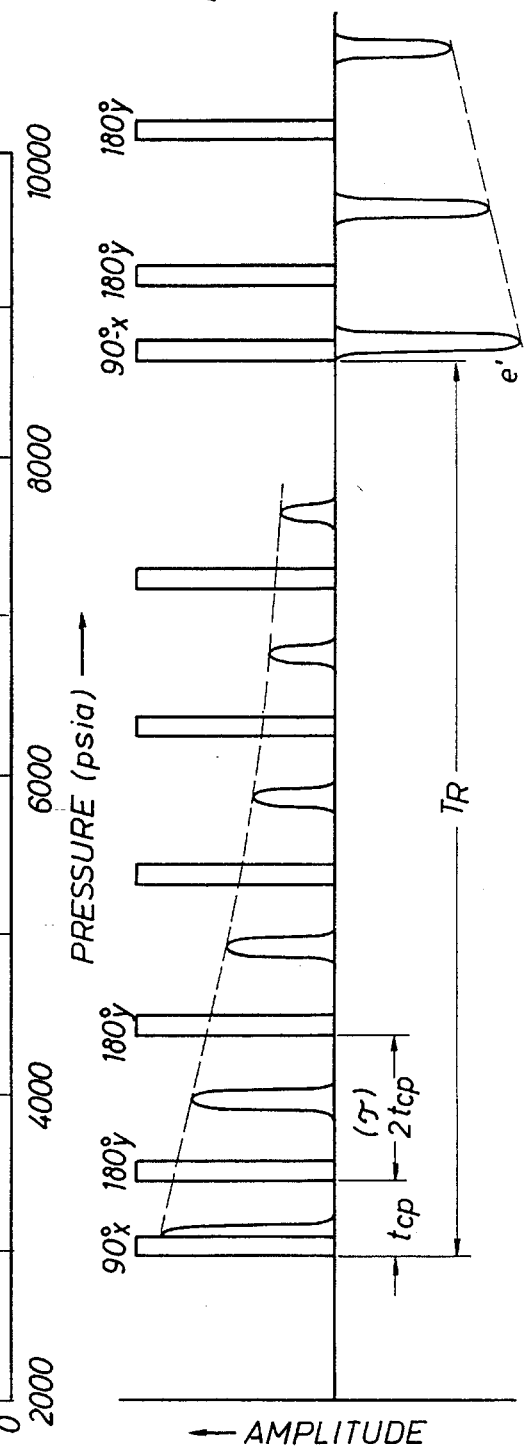
FIG. 2 shows a typical CPMG echo sequence (with phase alternation of the 90° pulse) used for measuring transverse relaxation time, T2.
Figure 3:
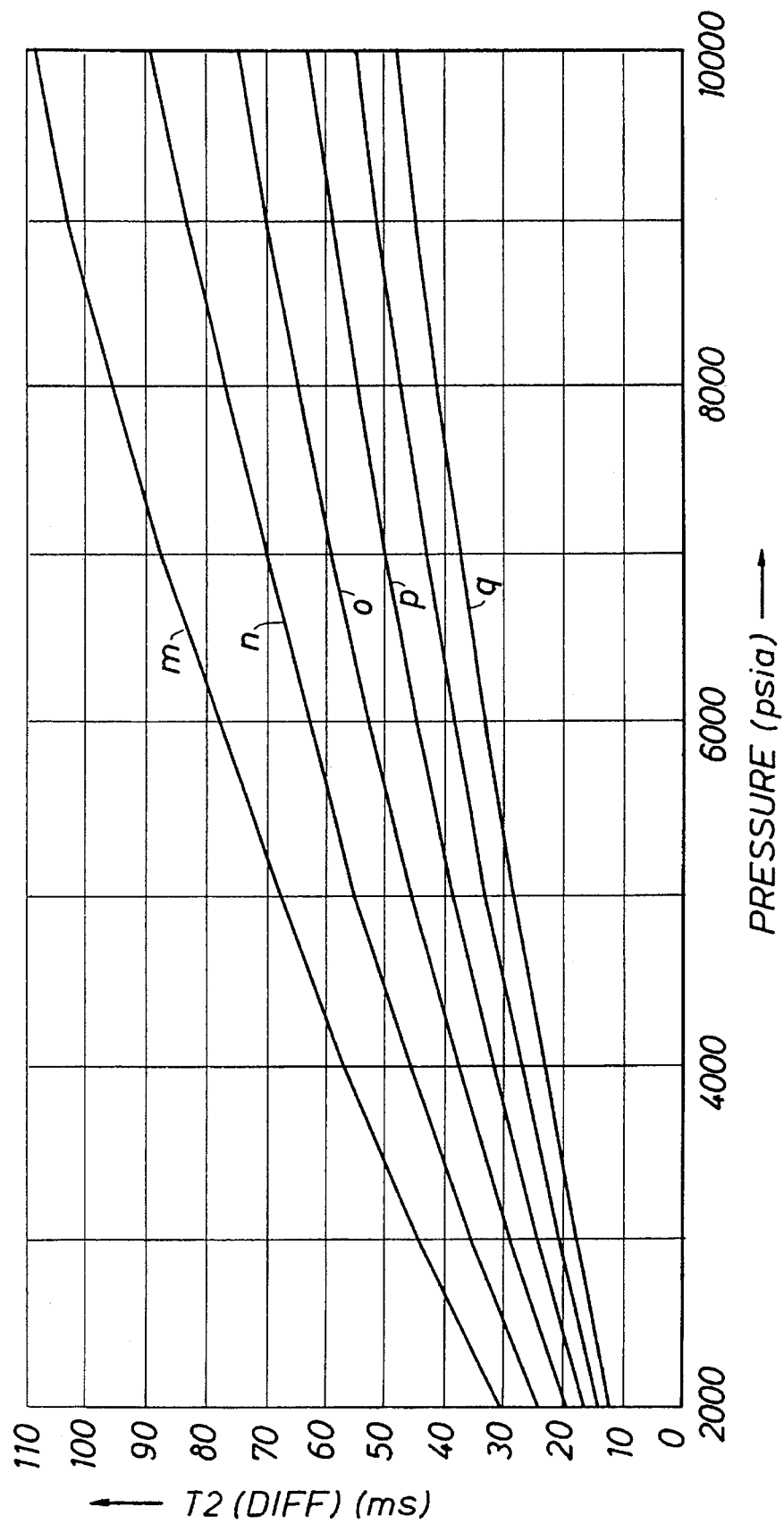
FIG. 3 is a plot of T2 for natural gas for a T2 for unrestricted diffusion, as measured by a MRIL C logging tool, as a function of pressure for different temperatures.

Referring now to FIG. 2, an exemplary CPMG pulse sequence with phase alternation of the 90° pulse is shown. This pulse sequence is used for measuring transverse relaxation timer T2. The sequence consists of a 90-degree RF pulse (at the Larmor frequency), followed at time $t_{cp}$ by a train of equally spaced 180-degree pulses. The spacing of the 180-degree pulses is $2t_{cp}$. For example in the MRIL C this time can be as short as 1.2 ms. A spin echo, e, is obtained between each of the 180-degree pulses. The sequence is repeated a time $T_R$ later with a 90° RF pulse of opposite phase (relative to the preceding 90° RF pulse). The subsequent train of negative echos, e', is subtracted from the previous train thus building up coherent signals and canceling instrument artifacts.

When there are multiple fluids in the pore space, and a range of pore sizes, the NMR signal, A(t), represents a sum of exponential decays:

$$A(t) = \sum_{i=0}^{n} a_i e^{-t/T2_i} \qquad (2)$$

where $a_i$ is a constant, $T2_i$ is a constant representative of a relaxation time and n is an integer wherein n $T2_i$s are selected at equal logarithmic intervals. Typically, thirty five to fifty intervals, n, result in an acceptable fit to echo data. The time domain data can be inverted using a multiexponential inversion program yielding a histogram, or a plot of $a_i$ as a function of $T2_i$. This inversion is discussed in, for example, U.S. Pat. No. 5,291,137.

Relaxation times of components that are bound to solids are generally significantly shorter than components that are not bound to solids. Surfaces in formations are generally either water or oil wet but are not gas wet. Thus, surface relaxation effects are negligible for gases.

A multiexponential inversion of an echo train from a NMR response such as that displayed in FIG. 2 can therefore be expressed as a T2 relaxation time distribution. The ordinate would be the signal amplitude associated with each $T2_i$ time constant by fitting $a_i$ for the given sets of $T2_i$s.

In FIG. 2, the sequence is repeated after a recovery time, $T_R$. If $T_R$ is greater than three times T1, then almost complete relaxation will occur. If $T_R$ is not significantly greater than T1, a correction factor, $\alpha$, is applied to account for partial saturation. This correction is given by:

$$\alpha = 1 - e^{-\frac{T_R}{T1}} \quad (3)$$

However, if $T_R$ is significantly less than T1, then the magnetization will be completely saturated and a signal will not be detected from the gas. Because T1 is significantly shorter for pore water and hydrocarbon liquids, hydrocarbon gas can be differentiated from water and hydrocarbon liquids by performing two NMR logs, one with a recovery time less than the relaxation time of the gas, and one with a recovery time equal to or greater than the relaxation time of the gas. The gas can be identified as the difference between the two logs. This difference between the two logs that represents the gas contribution to the NMR responses can then be used to determine the pore sized within the formation. This is possible because of the relaxation mechanism that predominates for hydrogen in a gas phase as opposed to a liquid phase.

The relaxation mechanisms that affect T1 and T2 in rocks are (1) molecular motion in fluids, (2) surface relaxivity at the pore wall, and (3) molecular diffusion in magnetic field gradients.

The first mechanism, due to local motions such as molecular tumbling, is called bulk relaxation. Longitudinal relaxation times and transverse relaxation times are equal when the predominant relaxation mechanism is bulk relaxation. Bulk relaxation is the predominant relaxation mechanism for liquid water and heavy hydrocarbon liquids.

The second relaxation mechanism is surface relaxation at the pore wall, or the relaxation of $^1$H nuclei when they closely approach paramagnetic ions such as iron and manganese which reside on grain surfaces. This is the dominant mechanism for fluid molecules such as water that wet the rock surfaces. However, because gas is always non-wetting and never closely approaches the rock surface, this mechanism is negligible for gas. This provides a major advantage in the practice of the present invention in that only one relaxation time is measured for the gas, not a distribution of relaxation times that is a function of rock properties. This relaxation is generally very rapid.

The third relaxation mechanism is the diffusion of molecules in magnetic field gradients. This relaxation mechanism affects only T2 and not T1. Therefore, when diffusion is a prominent relaxation mechanism, T2 will differ from T1. Diffusion is a predominant relaxation mechanism only for gas.

Unrestricted diffusion will be the lower limit of the range of T2 within which the gas NMR responses are to be expected. The upper limit is set by the restricted diffusion.

Using a CPMG sequence, the relaxation time due to diffusion (T2D) when diffusion is unrestricted by pore size is:

$$T2D = \frac{3}{\gamma^2 G^2 D_o t_{CP}^2} \quad (4)$$

where $\gamma$ is the $^1$H gyromagnetic ratio (26,741 radians/s-gauss), $D_o$ is the unrestricted diffusion coefficient, G is the field gradient created by the NMR tool, and $t_{CP}$ is half of the CPMG pulse spacing. This is the predominant relaxation mechanism for the gas phase.

$D_o$ supercritical methane as a function of temperature and density can be found, for example, in Gerritsma et al., supra, and also in Dawson et al., AIChE Journal, Vol 16, No. 5, 1970. Under typical reservoir conditions, methane will have a density of about 0.2 g/cc, and a diffusion coefficient about 50 times that of water, or about $109 \times 10^{-5}$ cm$^2$/s compared to $2 \times 10^{-5}$ cm$^2$/s for water. Thus, using equation (4), if unrestricted bulk diffusion occurred, with the MRIL C logging tool (G=17 gauss/cm, $t_{CP}$=0.6 ms), T2D would equal 37.1 ms.

Referring now to FIG. 4, T2D for diffusion that is unrestricted by pore diameters is shown plotted as a function of pressure for temperatures of 100° F. to 350° F. in fifty degree increments as lines m through r respectively, using the parameters of the MRIL C tool.

$D/D_o$ can be expressed as a function of $(D_o T)^{1/2}$, where D is the restricted diffusion coefficient, and T is the interecho time in a fixed gradient experiment or the intergradient pulse time in a pulsed field gradient NMR. For short times where only a small restriction occurs, it has been shown that:

$$\frac{D}{D_o} = 1 - \frac{4}{9\sqrt{\pi}} \left( \frac{S}{V} \right) \sqrt{D_o \tau} \quad (5)$$

where S/V is the surface-to-volume ratio of the pores. For long echo times $D/D_o$ approaches 1/tortuosity as the fluids diffuse through many pores. Tortuosity is defined as the product of the formation resistivity factor, F, and the formation porosity, $\phi$. The formation resistivity factor can be determined, for example, using an induction log, and the porosity can be determined from a neutron log.

A Padé approximation can be used for fitting between the short and long echo time behaviors. An acceptable Padé approximation is:

$$\frac{D(\tau)}{D_o} = 1 - \left(1 - \frac{1}{F\phi}\right) \left( \frac{\frac{4\sqrt{D_o \tau}}{9\sqrt{\pi}} \left(\frac{S}{V}\right) + \left(1 - \frac{1}{F\phi}\right) \frac{D_o \tau}{D_o \theta}}{\left(1 - \frac{1}{F\phi}\right) \frac{4\sqrt{D_o \tau}}{9\sqrt{\pi}} \left(\frac{S}{V}\right) + \left(1 - \frac{1}{F\phi}\right) \frac{D_o \tau}{D_o \theta}} \right) \quad (6)$$

where $\phi$ is formation porosity, F is the formation resistivity factor, and $\theta$ is a fitting parameter that can be approximated by the following relationship:

$$\theta D_o \cong 100 (S/V)^{-2} \quad (7)$$

If the gas saturation ($S_g$) is not equal to one, $1/F\Phi$ is replaced by $S_g/F\Phi$.

From equations 6 and 7, a S/V can be found for a given set of fluid properties and a measured D from a NMR log with a known echo time. The pore diameters d, for spherical pores, is a function of S/V as follows:

$$d = 6(S/V)^{-1} \quad (10)$$

This relationship is generally accepted as an approximation for pore size within a formation, and can be used in the practice of the present invention to estimate pore size based on a S/V determined from equation 7.

Figure 4A:
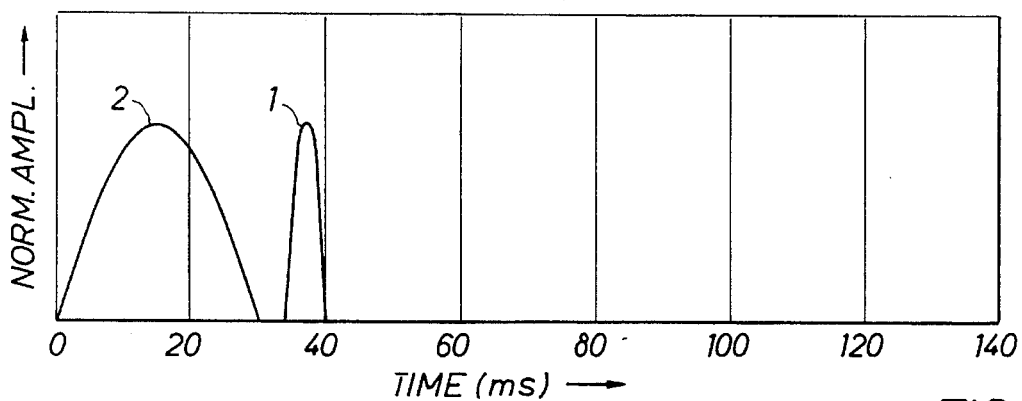
FIG. 4A shows a T2 histogram for a sandstone containing brine and natural gas, where the pores are 1000 microns in diameter and the diffusion coefficient of methane is unrestricted from bulk diffusion.

FIG. 4A shows an exemplary T2 histogram for a 30 PU sandstone containing only brine and natural gas, where the pores are 1000μ in diameter and the diffusion coefficient of methane is unrestricted from bulk diffusion. MRIL C parameters are assumed. The sandstone is at irreducible water saturation, which for a sandstone means that the T2 of the irreducible water 2 is less than 30 ms. Thus all the water is bound by surface interactions and will not be produced. The T2D for the methane results in the methane peak at 37 ms. Assuming the hydrogen index (HI) of the methane at reservoir conditions is 0.35, the area under the 37 ms peak is divided by 0.35, resulting in a total porosity of 30 PU and a gas saturation of 70%. The location of the methane peak at 37 ms shows that the pores are 1000μ or larger.

Figure 4B:
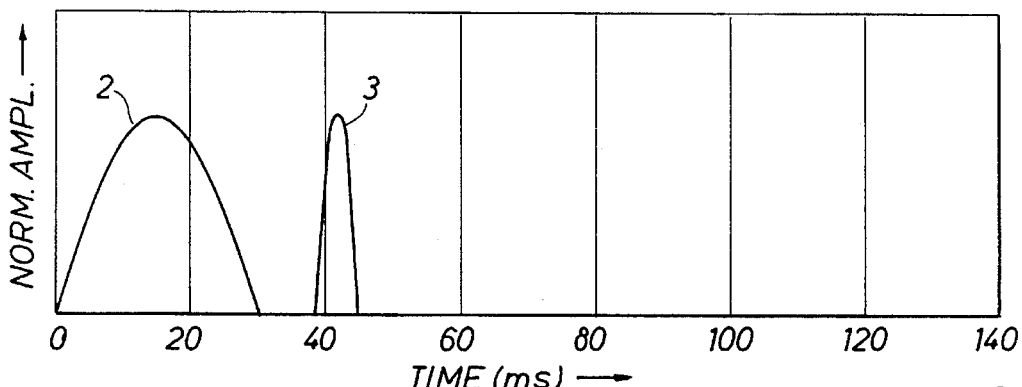
FIG. 4B shows a T2 histogram for a sandstone containing brine and natural gas, where the pores are 100 microns in diameter and the diffusion coefficient of methane is slightly restricted from bulk diffusion.

FIG. 4B shows an exemplary T2 histogram for a 30 PU sandstone containing only brine and natural gas where the pores are 100μ microns in diameter and the diffusion coefficient of methane is slightly restricted from bulk diffusion. The T2D for the methane 3 is 42.8 ms, showing slight restriction from bulk diffusion.

Figure 4C:
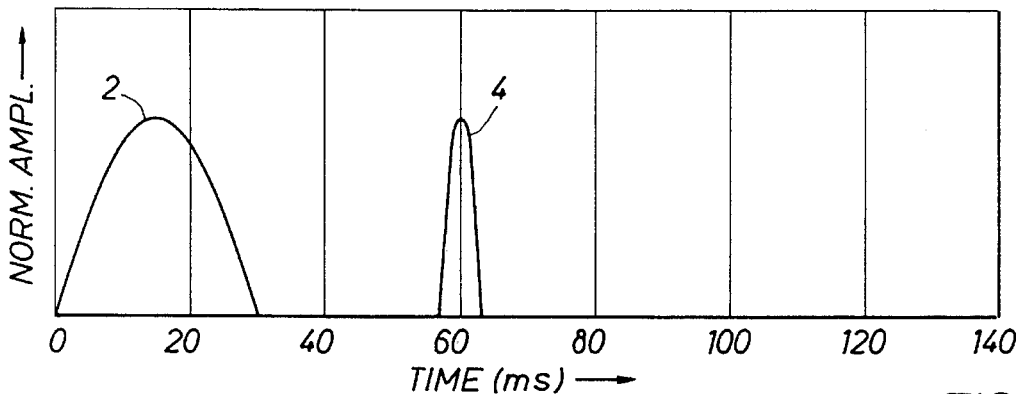
FIG. 4C shows a T2 histogram for a sandstone containing brine and natural gas, where the pores are 20 microns in diameter and the diffusion coefficient of methane is significantly restricted from bulk diffusion.

FIG. 4C shows an exemplary T2 histogram for a 30 PU sandstone containing only brine and natural gas, where the pores are 20μ in diameter and the diffusion coefficient of methane 4 is significantly restricted from bulk diffusion. The T2D for the methane is 60 ms.

Figure 4D:
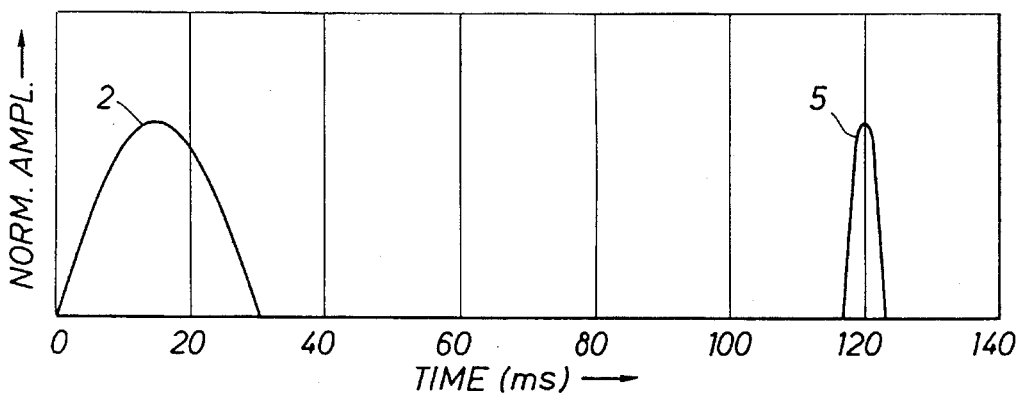
FIG. 4D shows a T2 histogram for a sandstone containing brine and natural gas, where the pores are less than 0.1 microns in diameter so that the diffusion coefficient of methane is restricted to 1/(tortuosity).

FIG. 4D shows an exemplary T2 histogram for a sandstone containing only brine and natural gas, where the pores are less than 0.1μ. The T2D for the methane is 122 ms. For this rock D/Do has reached its long time value of (1/tortuosity).

Once the pore size is estimated from the T2D of the methane, equations well known in the art can be used for estimating permeability from pore size. Some of these equations are disclosed in U.S. Pat. No. 4,719,423, the disclosure of which is incorporated herein by reference.

In more general cases, there may be three phases coexisting in the pore spaces of the rock, namely brine, crude oil, and gas. Another complexity would be if the brine phase is not at irreducible saturation. If brine, crude oil and natural gas are present as two separate phases in the pore space, and some or all have overlapping T2 relaxation, two logs, each with a different echo sequence, are obtained. One log utilizes an echo sequence where the recovery time is significantly shorter than the longitudinal relaxation time, T1, of the gas and a second with a recovery time equal to or longer than the longitudinal relaxation time of the gas. Amplitudes of the two logs are subtracted and the remainder represents the T2 distribution attributable to the gas.

Either total amplitudes from the two CPMG sequences or T2 distributions obtained from the multiexponential inversions obtained from the data in both CPMG sequences can be subtracted from each other, with the difference being the total amplitude due to the gas or the gas only T2 distribution, respectively.

When subtracting two CPMG sequences, a zone of interest can either be logged twice or more times, or one can utilize different pulse sequences in the two annuli probed by a tool such as the MRIL C logging tool. The MRIL C logging tool allows separate CPMG sequences at two annuli spaced 0.09 inch apart. One of the CPMG sequences can utilize a long $T_R$ compared to the T1 of methane, the other a $T_R$ that is shorter than the T1 of methane. For example, one $T_R$ can be six to twelve seconds while the other is 1.5 seconds, when the T1 of the gas in the formation at formation conditions is 4 seconds. It is preferred to use the two annuli method rather than logging the zone twice because of depth shifts introduced by having to relog the same zone.

The MRIL C tool has a depth-of-investigation of 16 inches. In an eight inch diameter borehole, the formation can be examined up to four inches of the bore hole wall. Oil-based muds have low invasion to this depth and are therefore the preferred drilling mud for practice of this invention. With low invasion oil-based muds the gas saturation observed by the MRIL C logging tool will be unflushed. In particular, ESCAID 110 oil-based drilling mud with 80% ESCAID 110 and 20% CaCl2-saturated water to provide very little invasion and is therefore a preferred system.

We claim:

1. A method to estimate the pore size within a formation containing hydrocarbon gas, the hydrocarbon gas having a longitudinal relaxation time, the method comprising the steps of:

obtaining a pulsed NMR log using a recovery time that is equal to or greater than the longitudinal relaxation time of the hydrocarbon gas;

determining, from the NMR log using a recovery time that is equal to or greater than the longitudinal relaxation time of the hydrocarbon gas, a distribution of transverse relaxation times;

determining from the distribution of transverse relaxation times a restricted diffusion coefficient of hydrocarbon gas within the formation; and estimating from the restricted diffusion coefficient of hydrocarbon gas within the formation the pore size within the formation.

2. The method of claim 1 further comprising the step of:

obtaining a second NMR log using a recovery time that is significantly shorter than the estimate of the longitudinal relaxation time of the hydrocarbon gas, and wherein the distribution of relaxation times attributable to hydrocarbon gas is determined from the NMR log, using a recovery time that is significantly shorter than the estimate of the longitudinal relaxation time of the hydrocarbon gas and the NMR log using a recovery time that is equal to or longer than the estimate of the longitudinal relaxation time of the hydrocarbon gas, by subtracting distributions of transverse relaxation times from the two NMR logs.

3. The method of claim 1 wherein the NMR log is a pulsed NMR log.

4. The method of claim 1 wherein the NMR log utilizes a CPMG sequence.

5. The method of claim 1 wherein the NMR log is a pulsed NMR log and the NMR log utilizes a Carr-Purcell sequence.

6. The method of claim 1 further comprising the step of estimating the formation permeability from the estimate of the pore size within the formation.

7. The method of claim 2 wherein the NMR log is a pulsed NMR log.

8. The method of claim 7 wherein the NMR log utilizes a Carr-Purcell sequence.

9. The method of claim 8 wherein the NMR log is a pulsed NMR log and the NMR log utilizes a Carr-Purcell sequence.

10. The method of claim 9 further comprising the step of estimating the formation permeability from the estimate of the pore size within the formation.

* * * * *